March 9, 1926.

Re. 16,287

F. W. BAKER

VEHICLE WHEEL

Original Filed Feb. 2, 1920

Inventor,
Frederick William Baker.

By his Attorney.
Ramsay Hoguet.

Reissued Mar. 9, 1926. Re. 16,287

UNITED STATES PATENT OFFICE.

FREDERICK WILLIAM BAKER, OF STOURBRIDGE, ENGLAND.

VEHICLE WHEEL.

Original No. 1,524,806, dated February 3, 1925, Serial No. 355,632, filed February 2, 1920. Application for reissue filed September 23, 1925. Serial No. 58,182.

*To all whom it may concern:*

Be it known that I, FREDERICK WILLIAM BAKER, a subject of the King of Great Britain, and a resident of Oldswinford, Stourbridge, in the county of Worcester, England, have invented certain new and useful Improvements in Vehicle Wheels, of which the following is a specification.

My invention relates to that type of wheel which comprises two concentric metallic rims spaced apart by distance pieces, the inner or fixed rim being connected with the hub, and the outer rim carrying the pneumatic or other tire, with the object of making use of the natural resilience of the two rims.

The object of my invention is to realize or attain, in an arrangement of this kind, the maximum of resilience for the purpose of absorbing shocks, whether originating in the drive, or in obstacles encountered on the road, with the minimum of deformation of the wheel due to such shocks.

In my invention the fixed rim is attached to the outer rim at three equidistant places, each attachment being preferably of greater dimension in the direction of the circumference of the wheel than in depth (i. e. the radial distance between the two rims) so as to permit of such attachment transmitting the driving torque to the outer rim without undue strain on the attachment. I also preferably make the area of attachment as stiff as possible to constitute each arc of 120 degrees of the outer rim, in effect what is known as an "encastré beam", whereby the deflection produced by the outer rim encountering an obstacle is reduced to a minimum. At the same time, by having three places of attachment only, the arcs of the outer rim are made as long as possible, and the spring action of the outer rim is at a maximum. The fixed rim is connected to the hub by means of a spoke system comprising a three armed spider the arms of which are preferably longitudinally curved, and arranged in a symmetrical combination or series of arches between the inner rim and the hub with the ends of the spokes attached to the inner rim at points substantially midway between the clip bearers and the central portions of the spokes secured to the hub, whereby such shock as is transmitted from the outer to the fixed rim produces the minimum of deflection and yet at the same time the arcs of the inner rim are made as long as possible with a view of getting the maximum of spring action.

In these drawings.

The same letters of reference are used to indicate corresponding parts in the several figures.

Figure 1:
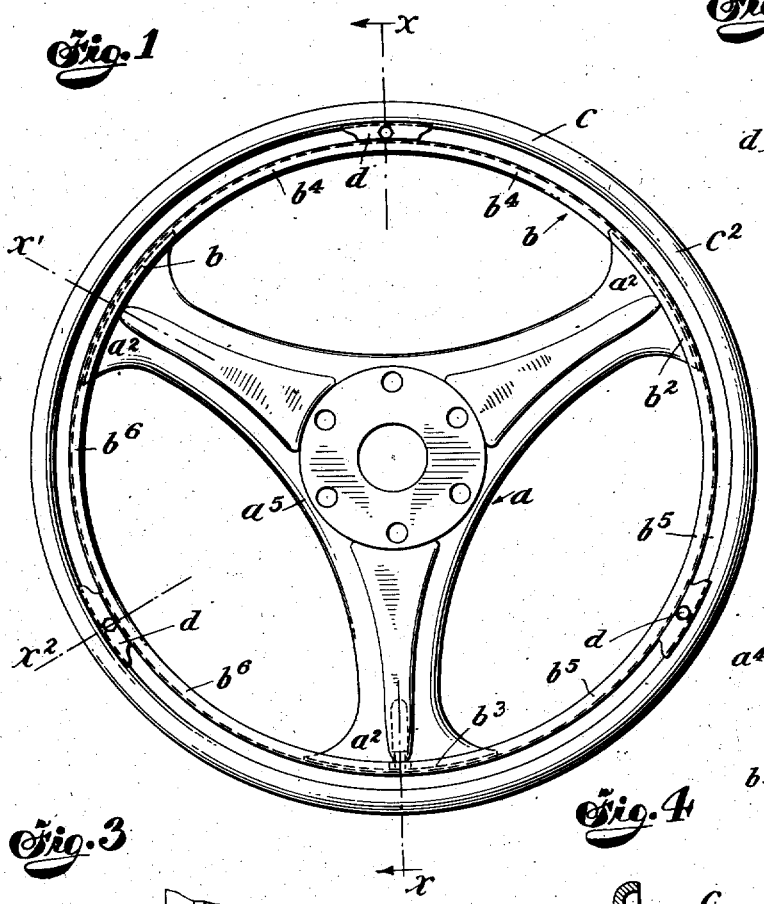
Figure 1 is an elevation of the complete wheel, which embodies a detachable metal rim for carrying a pneumatic tire.
Figure 2:
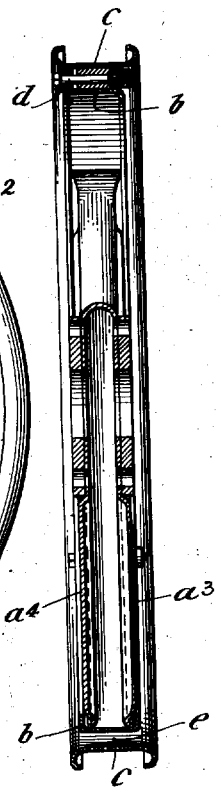
Figure 2 is a vertical section of Figure 1 on the dotted line $x$.
Figure 3:
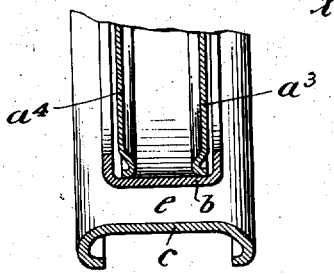
Figures 3 and 4 are enlarged scale sections taken respectively on the dotted lines $x^1$ and $x^2$, Figure 1.
Figure 4:
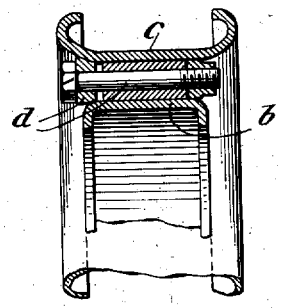

According to the said invention, as in the example illustrated, I propose to permanently mount around the centre $a$ of the wheel, a metal ring or felloe $b$ (preferably steel) which is connected to a three armed spider $a$ at three equi-distant places so as to leave the sections of the ring intermediate the connections free to spring, yield, or give within limits imposed by the natural elasticity of the metal. In the particular construction shown in the drawings, where the centre has three radial arms or branches $a'$, the connections $a^2$ between the outer ends of these arms and the ring $b$ are arranged at 120 degrees apart, whilst the rim $c$ that carries the tire is concentrically mounted around the said felloe-ring (preferably by clips or other connections such as $d$ that permit of the detachment of the said rim) but it is separated therefrom by an annular space $e$; and these rim connections $d$ are likewise three in number and are separated and equi-distantly disposed so as to leave the intermediate and naturally-elastic portions $c'$, $c^2$, $c^3$, of the rim likewise free to spring or yield in the same manner as the unconnected portions $b'$, $b^2$, $b^3$, of the inner felloe $b$. Said connections $d$ are of greater dimension in circumference than in the radial direction, and so far as this invention is concerned they may be detachable or fixed, and may or may not permit the demounting of the outer rim, the important thing being to produce the wide resilient arcs of the outer rim and to distribute the bearings between the parts where the inner rim connects with the spoke system.

The connections $d$ between the rim $e$ and felloe $b$, are disposed so that they alternate all round the wheel with the connections between the felloe and the ends of the arched spokes, that is to say, in a construction such as shown in which the three felloe and centre connections $d$ are spaced at 120 degrees apart, and three connections $d$ between the felloe and the rim are likewise spaced, I arrange each of the rim clips $d$ midway between the felloe and the centre so that each point of attachment of the rim with the wheel is located at the middle of the unattached resilient portion $b'$, $b^2$, or $b^3$, of the felloe $b$, which enables the spring of the said felloe to be used to the best advantage as a medium for taking up any shocks that may be transmitted from the road to the rim and thence through the rim-clips to the felloe. Further, by virtue of the annular spacing or separation of the rim and felloe and the wide angular separation of the connections $d$, the free or unconnected and resilient parts $c'$, $c^2$, $c^3$, of the rim itself also serve effectively to take up road shocks or to prevent their unmodified transmission of shocks to the spoke system and axle; the arrangement being such that as the wheel rotates, free or unconnected sectors of the rim and felloe are alternately available to serve after the manner of springs for cushioning the wheel centre.

A further advantage of the alternating disposition of the two separate series of connections $a^2$, $d$, is that, as the wheel centre is in spaced connection only with the felloe, and the free and unconnected sections of the felloe in turn are in spaced connection with the annularly separated rim, the part of the wheel between the hub or axle and the circumference that are under load compression cannot transmit a dead compression thrust on the circumferential parts of the structure, since when one of the felloe to centre connections is under the hub and subjected to vertical load, the resilient sector of the felloe to which the centre is connected can yield or give under the thrust, which prevents the elasticity of the corresponding sector of the rim itself being neutralized or impaired by the load.

The loaded centre of the wheel is carried in suspension from the encircling rim through the medium of the rim clips; these clips being of any suitable construction that will provide for or admit of the detachment of the rim and tyre from the other parts of the wheel when required.

The centre portion $a$ of the wheel may be of any suitable construction which will lend itself to spaced attachment with the felloe. For instance, I may use spoke arrangements such as described in the specification of my concurrent application for a U. S. Patent Serial No. 355,631, filed February 2, 1920, or I may adopt a pair of stamping or pressings $a^3$, $a^4$, which comprise three radial arms and are braced or welded together to produce a hollow structure having three spoke-like arms $a^1$, radiating at angles of 120 degrees from the middle portion $a^5$; the said middle portion being furnished with a hub $g$ of any suitable type whilst the outer ends of the spoke-like arms are suitably connected.

The hub or hub casing may be separately made and riveted or otherwise attached to the centre of the hollow spoked structure; or the middle portions of the stampings may be formed with collars or circular flanges that register when the stampings are assembled and may be fitted with a tubular liner or sleeve to complete the hub body. The said longitudinally curved or arched spokes and the hub constitute a three-armed spider and the said spokes are preferably made of sheet metal stampings.

This spider $a$ (made preferably of sheet metal stampings) may otherwise be described as a semi-disc wheel centre, in that it has all the essential characteristics of a disc wheel (strength, lateral rigidity, simplicity, cheapness, ease of cleaning, etc.) but from the fact that it is shaped and adapted to permit of connection with the inner rim or ring at three areas of relatively short angular or circumferential measurement, it allows the disc wheel essentials to be obtaining without sacrificing the spring or elasticity of the inner ring.

Usually in wheels of the general character described, the load and shock or thrust have a tendency to deform the wheel into elliptical shape. This causes a loss of power as the flattened side of the wheel is substantially on the road and the effect is analogous to constantly running up grade.

With my construction it will be seen that if there is resilience in the rim, it is confined to a sector between the members $d$, thus limiting the deformation, and such deformation even is theoretical rather than real, because the shock is absorbed and distributed between the several members $d$ and the ends of the spoke member $a'$. The spoke system prevents any noticeable deformation of the wheel, and if the rims are rigid instead of resilient, the distribution of strain is substantially as stated.

I claim:—

1. In a wheel of the class described, an outer rim, an inner rim within and spaced from the outer rim, clip bearers between said rims each of greater circumferential dimension than of radial dimension, said clip bearers detachably securing said rims together, and a three armed centre member comprising a hub, and three longitudinally curved spokes arranged in a symmetrical combination of series of arches and between the inner rim and the hub, the ends of the spokes being secured to the inner rim at points substantially midway between the clip bearers, and the centre portions of the spokes being secured to the hub.

2. A vehicle wheel comprising an outer rim, an inner rim spaced from the outer rim, spacing and bearing members between said rims each of greater circumferential dimension than of radial dimension, said bearing members being disposed at equi-distant points, a hub, and a three armed spider connecting the hub and the inner rim, the arms of the spider being curved to form a symmetrical series of arches and having their outer ends secured to the inner rim at points substantially midway between said bearing members.

3. A vehicle wheel comprising spaced concentric inner and outer rims, bearing members between the rims equi-distantly spaced, and a spoke system having a three armed spider with the outer ends of the arms connecting with the inner rim at points essentially midway between the said bearing members.

4. A vehicle wheel comprising spaced concentric inner and outer rims, three bearing members spaced at equi-distant points between the rims, and a three armed spider constituting the spoke system of the wheel, said arms being curved to form symmetrical arches, and with their outer ends connected to the inner rim at points midway between said bearing members.

FREDERICK WILLIAM BAKER.